Dec. 30, 1941.    C. B. SPASE ET AL    2,267,996
CLUTCH RELEASE THROTTLE CONTROL MECHANISM
Filed Dec. 23, 1938    2 Sheets-Sheet 1
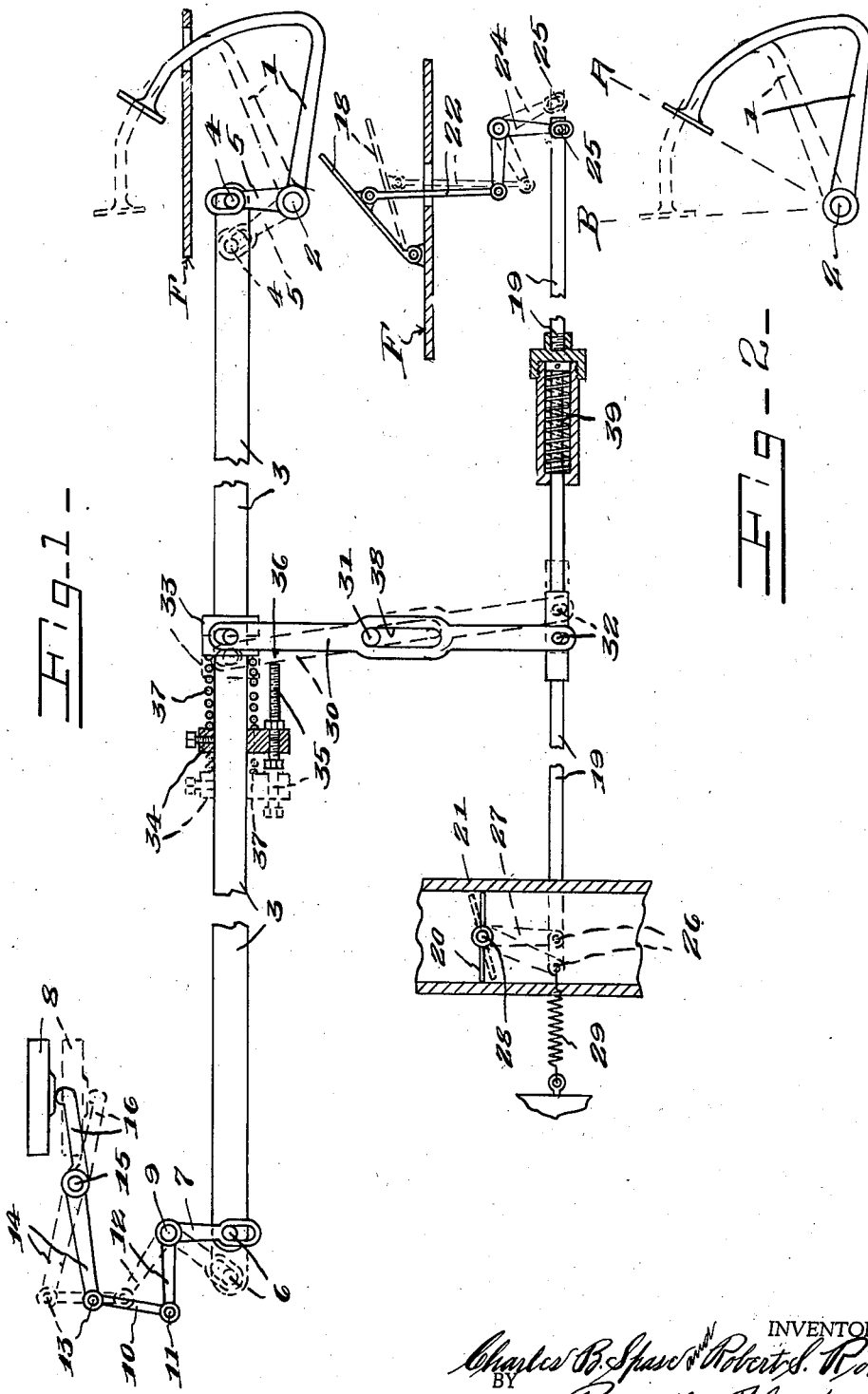
INVENTORS,
Charles B. Spase and Robert S. Root.
BY Bodell & Thompson.
ATTORNEYS Dec. 30, 1941.   C. B. SPASE ET AL   2,267,996
CLUTCH RELEASE THROTTLE CONTROL MECHANISM
Filed Dec. 23, 1938   2 Sheets-Sheet 2

Fig-3-

INVENTORS.
Charles B. Spase and Robert S. Root
BY
Bodell & Thompson
ATTORNEYS.

Patented Dec. 30, 1941

2,267,996

UNITED STATES PATENT OFFICE 2,267,996

CLUTCH RELEASE THROTTLE CONTROL MECHANISM

Charles B. Spase, Nedrow, and Robert S. Root, Syracuse, N. Y., assignors to W. C. Lipe, Inc., Syracuse, N. Y., a corporation of New York Application December 23, 1938, Serial No. 247,448

3 Claims. (Cl. 192—.01)

This invention has for its object a clutch release, throttle control mechanism by which the degree to which the engine of a motor vehicle, as a bus or truck, is limited to a predetermined R. P. M. while the clutch is released, so as to prevent the clutch from being used as a torque converter by the driver or to prevent the clutch from being engaged at too high an engine speed and slipped by the driver, and hence to prevent abuse of the clutch and the consequent burning off of the clutch faces due to slippage and high engine speed during the engaging moment of the clutch.

More specifically, it has for its object an interconnection or a motion transmitting means between the clutch operating release or throw-out mechanism and the engine control mechanism by which the accelerating movement of the control mechanism is limited to a predetermined degree or range when the clutch is disengaged.

Other objects will appear throughout the specification.

The invention consists in the novel features and in the combinations and constructions hereinafter set forth and claimed.

In describing this invention, reference is had to the accompanying drawings in which like characters designate corresponding parts in all the views.

Figure 1 is a diagrammatic view of a conventional clutch operating mechanism and engine throttle mechanism equipped with this invention.

Figure 2 is a diagrammatic view illustrating the clutch pedal in the two positions between which the engine may be accelerated to slip the clutch intentionally by skilled operation, when it is necessary to use the clutch normally as a torque converter.

Figure 3 is a diagrammatic view of another form of the invention or another embodiment of the underlying idea of the invention.

In starting buses and similar types of vehicles from a stand-still, the driver unintentionally over-accelerates the engine during the moment of the clutch engagement. This subjects the clutch to a high degree of slippage with its attendant build-up of heat, and results in a short-lived clutch. This is particularly so in buses with the engine under the floor or in the rear, because the engine is so far remote from the driver that the driver is not sensitive to the engine speed or can not sense the engine speed by the sound or the feel thereof. As the bus makes many stops, and oftentimes has to start on grades, the burning out and destruction of the clutch, due to over-acceleration, is a frequent and common occurrence, and the problem of lengthening the life of the clutch a vital one.

This invention comprises inter-connecting means to control the speed of the engine from the clutch operating mechanism or clutch pedal at the time of engagement of the clutch or to prevent acceleration of the engine above a predetermined R. P. M. at the time of engagement of the clutch. The mechanism here illustrated is adapted for a vehicle in which the engine is under the floor or in the rear end of the vehicle.

Figure 3:
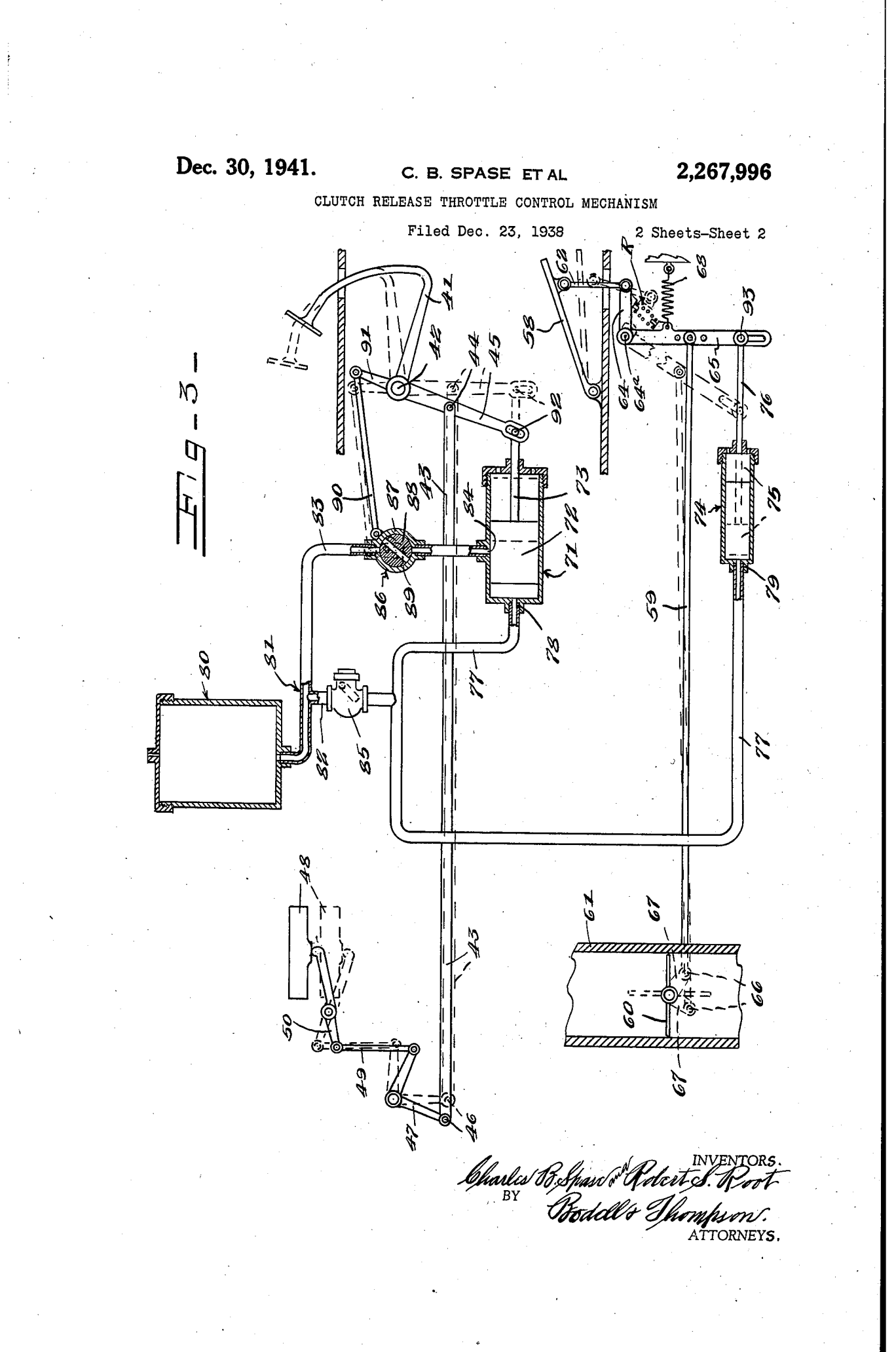

In Figure 1, the inter-connecting means includes a mechanical lever and a stop for limiting the movement of the lever by the accelerator pedal when the clutch is disengaged. In Figure 3, this means is hydraulic and a valve operated by the clutch pedal performs the function of the stop of Figure 1. The construction shown in Figure 3 is the preferable form but that shown in Figure 1 will be first described, as it facilitates the understanding of the form shown in Figure 3.

The clutch operating mechanism includes a clutch pedal 1 mounted on a rock shaft 2 suitably supported in the vehicle and extending through the floor F of the vehicle, a rod or link 3 pivoted at 4 at its front end through a rock arm 5 on the shaft 2, and pivoted at 6 to a lever 7 forming part of the motion transmitting means between the rod 3 and the throw-out collar 8 of the engine clutch. The motion transmitting mechanism, here illustrated, in addition to the lever 7 includes a bell crank lever pivoted at 9 to the frame of the vehicle, a link 10 pivoted at 11 to the arm 12 of the bell crank lever, and at 13 to an arm 14 on the rock shaft 15, on which is also mounted the throw-out yoke 16 which coacts with the throw-out collar 8 in the usual manner. This motion transmitting mechanism may be of any suitable form, size and construction and that here shown is illustrative only.

The engine control mechanism includes a suitable accelerating lever or pedal 18 connected, through suitable motion transmitting mechanism, to a link or rod 19, which operates the throttle or butterfly valve 20 in the intake manifold 21 of the engine. As here shown, the accelerator pedal 18 is connected by a link 22 extending through the floor F of the vehicle and to one arm of a bell crank lever 24, the other arm of which is pivoted at 25 to the front end of the rod or link 19. The rear end of the link 19 is pivoted at 26 to an arm 27 on the shaft 28 on which the throttle or butterfly valve 20 is mounted. A suitable returning spring 29 is connected to the arm 27 to return the throttle to closed position and accelerator pedal to raised position, when the foot pressure on the accelerator pedal is released.

The means here illustrated in Figure 1 to control the speed of the engine and limit the speed to a predetermined R. P. M. when the clutch pedal is released, comprises motion transmitting means between the rods 3 and 19 and a stop shiftable with the rod 3 and normally located out of the range of movement of said motion transmitting mechanism when the clutch is engaged and movable into the path of said mechanism when the clutch pedal is shifted from its normal position into its released position, the stop, when in its fully operated position, limiting the movement of the motion transmitting mechanism, and hence the movement of the accelerator pedal 18 and the movement of the throttle valve 20, to a predetermined amount. It also includes a spring movable with the stop for acting on the motion transmitting mechanism between the rods 3 and 19, it being normally out of effective position and movable into effective position to act on the motion transmitting mechanism between the rods 3 and 19, when the clutch pedal is moved out of its normal position toward its released position. When the clutch pedal is moved into throw-out position, any movement of the accelerator pedal 18, and hence the motion transmitting means between the rods 3 and 19, is against the action of the spring, and such motion is completely stopped, when the motion transmitting means engages the stop.

The motion transmitting means between the clutch operating and the engine control mechanisms as shown in Figure 1, is a lever 30 pivoted between its ends at 31 to the chassis or frame of the vehicle, and also pivoted at 32 to the rod 19 of the accelerator mechanism and having a bearing or collar 33 slidable on the rod 3 of the clutch operating mechanism.

34 designates the stop on the rod 3, this carrying an adjustable member, as a set screw, 35 to adjust the stop to the conditions of the particular installation. The stop is normally arranged when the clutch pedal is in normal position, that is, the position assumed when the clutch is engaged, out of the range of movement of the lever 30 under the influence of the accelerator pedal 18, as indicated in dotted lines in the drawings, so that when the clutch is fully engaged, the operation of the accelerator pedal 18 is unobstructed by the clutch operating mechanism. When, however, the clutch pedal is pushed down to approximately its fullest extent, the stop moves into the position indicated in full lines in the drawing and takes up the lost motion between it and the lever 30 when in idling position. The stop is located so that the end of the adjusting screw 35 is spaced apart at 36 a predetermined distance from the path of movement of the lever 30. This distance represents the amount of movement that the accelerator pedal may be actuated when the clutch is released, and hence the amount of opening movement of the throttle valve 20, and also hence the amount of acceleration above idling speed that the engine may be given when the clutch is released, hence, the maximum amount of acceleration that the engine may be given under ordinary driving conditions at the moment the clutch is being re-engaged.

37 designates the spring normally ineffective on the lever 30, but movable with the stop 34 into position to coact with the lever 30 when the clutch pedal is moved from normal position into released position. The spring 37 is here shown as a coiled spring slidable on the rod 3 and abutting at one end against the stop 34 and having its other end normally spaced from the lever 30. Therefore, the clutch pedal controlled spring 37 is spaced from, or is ineffective on, the lever 30 when the clutch is engaged. When the clutch pedal 1 is depressed to release the clutch, this spring 37 is moved along the rod 3 by the stop 34 and finally presses against the bearing or collar 33 of the lever 30. If the accelerator pedal 18 is depressed, and hence the lever 30 moved out of idling position shown by the broken lines (Figure 1), so that its end adjacent the rod 3 is to the left of idling position, then the throwing out of the clutch pedal 1 would cause the lever 30 to be actuated back toward idling position by the spring 37, even though the accelerator pedal 18 is held down. This operation is permitted on account of a relief device or spring arrangement in the accelerator pedal line to be presently described. Therefore, when the clutch is thrown out, the accelerator pedal 18 or the lever 30 may be actuated an amount determined by the space 36 or the engine may only be accelerated an amount determined by the space 36. The pivot 31 of the lever is mounted in a lengthwise slot 38 in the lever to adjust the lever to effect the proper ratio of movement between the rods 3 and 19.

39 is a spring located between sections of the rod 19 to permit relative movement of these sections, and hence prevent buckling of the rod 19 if the accelerator pedal is pressed down at the time the clutch is thrown out, and hence at the time that the spring 39 becomes effective on the lever 30 and actuates the lever 30 to its position assumed when the engine is idling.

In starting buses, etc., the clutch is thrown out and the shifting lever operated to shift the transmission gearing into low or starting gear, and then the clutch is re-engaged by permitting the clutch pedal to return, under the influence of the clutch spring, from its released position to its normal position. Usually, during such operation, the driver accelerates the engine abnormally and the result is slippage and burning out, and in a short time destruction of the clutch.

By this construction, when the clutch is thrown out, the amount of acceleration preliminary to starting is limited, as the movement of the lever is limited and determined by the movement of the adjusting screw 35 of the stop 34, and hence at the time the clutch comes into engagement the engine is not accelerated faster than a predetermined R. P. M. For instance, say that idling speed is 500 R. P. M., then the engine can not be accelerated above 1,000 or 1,200 R. P. M. when the clutch is disengaged. After the clutch is re-engaged, the engine may be accelerated any amount in the usual manner. However, there are certain times when it is desirable to slip the clutch or use it as a torque converter. Under such circumstances, the driver may do so purposely and not inadvertently, as for example only, the route that the bus takes daily may contain grades up to say five or six percent, and the axle ratio and mechanism for acceleration is adjusted accordingly. However, the bus may be stored at night or other times in a ramp garage having say an eight percent grade. Then the maximum amount of 1,000 or 1,200 R. P. M. may not be sufficient to start the bus up the eight percent grade. In this case, the driver may, by intentional and skillful manipulation of the accelerator pedal, speed up or spin the engine above the maximum R. P. M., say 1,000, when the clutch is released by momentarily and quickly depressing the accelerator pedal, while it is taking up the space at 36, and while the clutch pedal is moving from position A to position B (Figure 2), so that he temporarily and intentionally uses the clutch as a torque converter until the bus is in motion with sufficient momentum to be accelerated up the eight percent grade. However, under normal conditions, the driver may not inadvertently slip the clutch.

In Figure 3, the inter-connection between the clutch operating mechanism and the engine control mechanism for blocking the operation of the engine control mechanism to prevent acceleration of the engine above a certain R. P. M. at the time the clutch is about to be brought into engagement, is pressure-operated or hydraulic means.

41 designates the clutch pedal pivotally mounted at 42 on the frame of the vehicle. 43 designates a link or rod pivoted at one end at 44 to a rock arm 45 and at its other end at 46 to one arm of a bell crank lever 47 pivoted at its angle to the frame of the vehicle, the other arm of which is connected to the throw-out collar 48 of the clutch through mechanism, as a link 49 and a throw-out yoke 50, all analogous to the corresponding mechanism between the rod 43 and the throw-out collar, as shown in Figure 1.

58 designates the accelerator pedal of the engine control mechanism, this being connected through suitable mechanism to a link 59 which operates the throttle or butterfly valve 60 in the intake passage 61 of the engine. The accelerator pedal is here shown as connected by a link 62 extending through the floor F of the vehicle to a lever 64 pivotally mounted on a shaft 64ª and arm 65 which is pivoted to one end, as the front end, of the link 59. The other or rear end of this link is pivoted at 66 to an arm 67 on the shaft on which the butterfly valve is mounted. 68 is a returning spring arranged to return the butterfly valve to closed position, when the accelerator pedal is released. A release spring device R, similar to that including the compression spring 19 (Figure 1) is interposed between the lever arms 64ª, 65 to normally act as a unit or as a bell crank. The spring device R, however, permits movement of the arm 65 toward the arm 64, if the clutch pedal 41 is depressed when the accelerator pedal 58 is held depressed.

The inter-connection between the clutch operating mechanism and the engine control mechanism includes a cylinder 71 having a piston 72 working therein, the rod 73 of which is connected to the clutch operating mechanism, a cylinder 74 having a piston 75 therein, the rod 76 of which is connected to the accelerator mechanism, a conduit 77 connected at one end at 78 to the head of the cylinder 71 and its other end at 79 to the head of the cylinder 74, a reservoir 80 for an incompressible hydraulic liquid, as oil, and a supply conduit 81 from said reservoir 80 and having a branch 82 connected to the conduit 77 between the cylinders 71 and 74 and a branch conduit 83 connected to the cylinder 71 between the ends thereof through a port 84, this port being arranged to be uncovered by the piston when the piston approaches the end of its recession stroke, that it, the end of its movement to the right (Figure 3) at which time the clutch has been fully engaged. A check valve 85 is arranged in the branch 82 to prevent retrograde flow of the oil from the conduit 77 back into the reservoir 80.

86 designates a control valve in the branch 83, this including a casing 87 coupled between sections of the branch conduit 83 and a movable valve member 88 in the casing. The valve here shown is a rotary valve and the valve member 88 has a passage 89 extending diametrically therethrough arranged to open communication between the sections of the branch conduit 83, as the clutch comes into full engagement. The valve member 88 is connected through suitable means, as a link 90, with the clutch pedal or with a rock arm 91 which moves in synchronism with the clutch pedal. The rod 73 of the piston 72 is connected to the end of the rock arm 45 at 92, the link 43 being connected to this rock arm 45 between the ends of the rock arm 45. The rod 76 of the piston 75 is connected at 93 to the same lever arm 65 to which the link 59 of the accelerating mechanism is connected, the link 59 being connected to this arm 65 between the ends of the arm. Normally when the clutch is engaged and the clutch pedal is in the broken line position (Figure 3), the passage 89 of the valve is in line with the sections of the conduit 83.

When the vehicle is to be started, the clutch pedal 41 is depressed to its full line position. The valve member 88 is in closed position, that is, the position shown in Figure 3. The gearing is shifted from neutral to low or starting gear position. The depressing of the clutch pedal closes the valve member 88 and moves the piston 72 in the cylinder 71 to the left, forcing the fluid or oil through the conduit 77 to the cylinder 74 filling the same and holding the piston 75 to the left end of the cylinder 74, thus blocking operation of the accelerator mechanism or blocking operation of the throttle valve 60. The check valve 85 prevents retrograde flow of oil back into the reservoir 80. When the clutch pedal is released, the piston 72 moves to the right in the cylinder 71 and the oil fills in behind it from the reservoir 80 past the check valve 85, so that the accelerator pedal is held from movement.

When the clutch pedal 41 is depressed, the valve member 88 is rotated to a point which carries the passage 89 an appreciable distance out of alinement with the passages of the sections of the conduits 83 and during the release of the clutch pedal, the passage 89 does not begin to register with the passages of the sections of the conduit 83 until the clutch is about to engage, or until the clutch pedal reaches point A (Figure 2), and hence the accelerator pedal is blocked from movement, even after the piston 72 uncovers the port 84, until the passage 89 of the valve alines with the sections of the conduit 83 or until the valve opens the conduit 83. It thus relieves the accelerator pedal of retarding effect. This period during which the passage 89 first comes partially into alinement with the passages of the conduit sections 83 to the time it is in full alinement therewith, corresponds to the operation permitted by the space 36 of the form shown in Figure 1. A relief device R of the same nature as that embodying the spring 39 (Figure 1) is located in the engine control mechanism between the piston on the accelerator pedal to prevent straining of the parts, in the event the operator operates the accelerator pedal while the clutch is engaged and the transmission gear in neutral, and holds the accelerator depressed while depressing the clutch pedal, and the transmission gearing in low or starting gear, and then making the shift to starting gear from neutral. During this operation, the piston 72 would force the oil through the conduit 77 and move the piston 75 and other connections relatively to the depressed pedal 58, and hence there will be no acceleration of the engine while the clutch pedal is released, or the engine will be decelerated while the clutch pedal is being released, until the passage 89 of the check valve 88 begins to come into alinement with the sections of the conduit 83, acceleration will be permitted to a predetermined amount above idling speed. As, however, at the time the passage 89 is alined with the sections of the conduit 83, the clutch is shifted out of complete disengagement into complete engagement or while the clutch pedal is moving from point A to point B (Figure 2), there will be little or a minimum of slipping of the clutch. During ordinary driving, when the driver starts by letting in the clutch quickly and then depressing the accelerator pedal, or doing both nearly simultaneously, there will be no excessive slipping of the clutch while using the clutch as a torque converter, but when it is necessary to use the clutch as a torque converter, the operator may do so up to a certain extent by skillfully manipulating the clutch pedal and the accelerator pedal to slow up the time that the passage 89 of the valve member 88 is moving into full alinement with the conduit sections 83 after it has started to come into alinement with said sections.

What we claim is:

1. The combination with the clutch operating mechanism and the engine control mechanism of a motor vehicle; of means operated by the clutch operating mechanism for blocking the operation of the engine control mechanism to prevent acceleration of the engine when the clutch operating mechanism is in its thrown-out position, said means comprising pressure-operated elements connected respectively to the clutch operating mechanism and the engine control mechanism, and conduit means connecting said elements, whereby the pressure applied to one of said elements by the operation of the clutch operating mechanism is transferred to the other of said elements to restrain the operation of the engine control mechanism, a supply conduit for a hydraulic fluid, and a normally open valve arranged to control the flow of a fluid to the pressure-operated element connected to the clutch operating mechanism and movable into a closed position by the throwing out of the clutch operating mechanism.

2. The combination with the clutch operating mechanism and the engine control mechanism of a motor vehicle; of means operated by the clutch operating mechanism for blocking the operation of the engine control mechanism to prevent acceleration of the engine at the time the clutch engages in its operation from disengaged position, said means comprising a hydraulic system including a cylinder, a piston in the cylinder and connected to the clutch operating means, a second cylinder, and a piston therein connected to the engine control means, a conduit connecting the cylinders, a supply conduit communicating with the former conduit and with the first cylinder, a valve operable by the clutch operating mechanism for controlling the flow of fluid from the supply conduit to the first cylinder, and a check valve between the supply conduit and the first conduit.

3. The combination with the clutch operating mechanism and the engine control mechanism of a motor vehicle; of motion transmitting means between said mechanisms operable by the clutch mechanism and means operable by the clutch mechanism to block the operation of the engine control mechanism to accelerate the engine, when the clutch mechanism is operated from and toward its shifted-in position and to permit partial acceleration less than full acceleration, as the clutch mechanism reaches a position nearly but short of clutch engaged position, and permit full acceleration when the clutch mechanism reaches full clutch engaged position.

CHARLES B. SPASE.
ROBERT S. ROOT.